April 12, 1927.

W. E. MENZIES 1,624,420

BATTERY CHARGING SYSTEM

Filed July 13, 1922

WITNESSES:
C. M. Cochran
W. R. Coley

INVENTOR
William E. Menzies.
BY
ATTORNEY

Patented Apr. 12, 1927.

1,624,420

UNITED STATES PATENT OFFICE.

WILLIAM E. MENZIES, OF IRWIN, PENNSYLVANIA, ASSIGNOR TO WESTINGHOUSE ELECTRIC & MANUFACTURING COMPANY, A CORPORATION OF PENNSYLVANIA.

BATTERY-CHARGING SYSTEM.

Application filed July 13, 1922. Serial No. 574,737.

My invention relates to battery-charging systems.

The primary object of my invention is to provide improved means for automatically terminating the charging of a storage battery whenever the charge has reached its full value.

In the use of lighting units that are located in isolated places, the lighting circuit is normally supplied from a storage battery, which is maintained charged by the operation of a generator connected thereto. When the storage battery is discharged or nearly so, the operation of the generator is initiated so as to recharge the battery, but it is desirable to terminate the charging of the battery when the charge has reached its full value.

The desired result may be accomplished by several methods, two of which are illustrated in the accompanying drawings, wherein—

Figure 1:
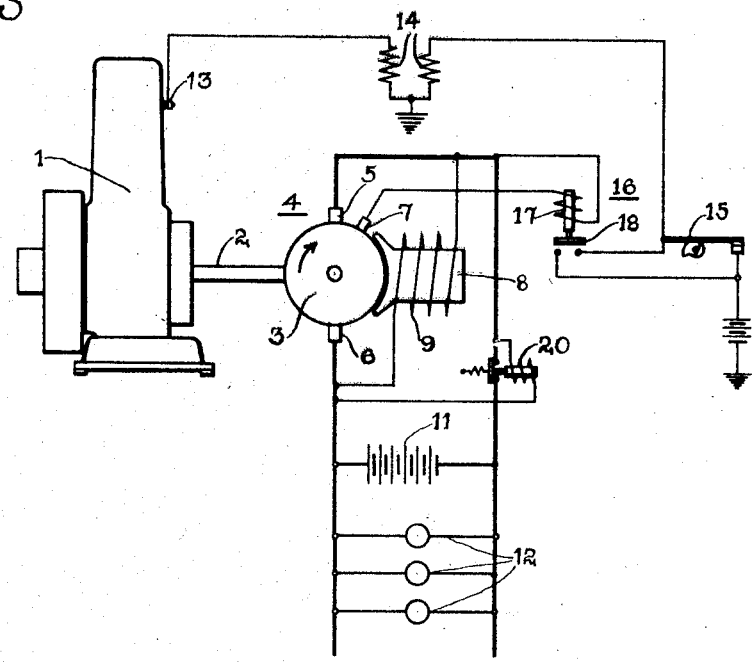
Figure 2:
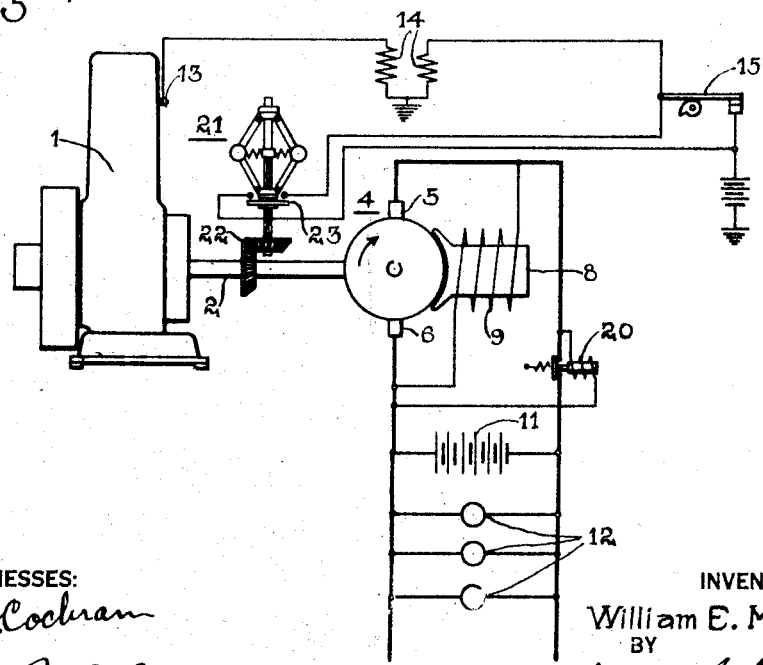

Figure 1 is a diagrammatic illustration of circuits and apparatus of one embodiment of my invention, wherein the cutout switch is actuated in accordance with certain electrical characteristics of the generator; and Fig. 2 is a diagrammatic illustration of circuits and apparatus of a second embodiment of my invention, wherein the cutout switch is actuated in accordance with the speed of the charging generator.

Referring to Fig. 1, a prime mover 1 has a shaft 2 upon which is mounted the armature 3 of a generator 4. The armature has co-operating therewith main brushes 5 and 6 and an auxiliary brush 7 that is disposed between the main brushes. The generator is also shown as having a pole-piece 8 upon which is mounted a shunt field-magnet winding 9. The load circuit of the generator 4 comprises a storage battery 11 and a lighting circuit, indicated generally at 12.

The prime mover is illustrated as an internal-combustion engine having a governor mechanism 10 adapted to secure a tapering charge for the battery 11, and an ignition circuit for the spark plug 13 which includes the usual coils 14 and an interrupter 15. A cutout switch 16 is adapted to control a shunt circuit for the interrupter 15 and comprises an electro-magnet 17 and a switch member 18. The coil of the electromagnet 17 is energized from the auxiliary brush 7 and main brush 5.

The operation of the system of Fig. 1 is substantially as follows, assuming the battery 11 to be discharged and the generator 4 to be beginning the charge:

At this stage, the generator 4 delivers full voltage and current to the battery 11. The switch 16 is thus held in its upper or open position.

As the state of charge of the battery increases, there is an increase in the armature current, with a consequent increase in armature reaction upon the field-magnet winding flux, which thus tends to decrease the voltage on the coil of the electromagnet 17. The cutout switch 16 is so proportioned that, when the charge is completed, the decreased energization received as the result of the armature reaction, as well as of the decreasing current by reason of the tapered charge of the battery, enables the switch 18 to close and thus short-circuit the interrupter or otherwise render the ignition circuit ineffective. Of course, other means of terminating the operation of the prime mover might be employed, such as cutting off the supply of fuel. In any event, when the operation of the prime mover is terminated, the circuit between the generator and the battery is automatically interrupted by means of the no-voltage release 20.

It will be noted that the coil of the electromagnet 17 is not connected across the battery terminals, whereby it would be affected merely by the increase in the battery voltage as the battery charge increased, but is connected across a portion of the generator armature where it not only receives the effect of the increase in voltage of the battery by reason of the armature reaction but also receives the effect of the decreasing current of the generator 4 by reason of the battery receiving a tapered charge. Hence, the cutout switch 16 is very sensitive and acts much more definitely and efficiently than the devices of the prior art.

Referring to the system of Fig. 2, the system is similar to that of Fig. 1, and, where the parts are similar, like reference numerals are used in the two figures.

Since a generator that is regulated to deliver a tapering charge to the storage battery decreases in speed as the charge of the battery nears completion, the cutout may be operated by either an independent fly-ball governor or by the governor for the prime mover 1.

In the system of Fig. 2, an independent flyball governor 21 is illustrated as operated from the shaft 2 of the prime mover 1 by means of gearing 22. The speed of the prime mover governs the closing of a switch 23 that controls the shunt circuit for the interrupter 15. The tendency of the prime mover is to increase in speed as the voltage of the armature circuit of the generator 4 rises by reason of the increase in the charge of the battery (assuming an approximately constant current to be delivered by the generator). The switch 23 will be closed, when the speed of the generator increases to a point corresponding to the full-charge condition of the battery 11, thereby interrupting the ignition circuit for the prime mover and terminating the operation of the plane. The battery-charging circuit is also interrupted by the no-voltage release device 20, as above described.

Modifications in the system and arrangement and location of parts may be made within the spirit and scope of my invention, and such modifications are intended to be covered by the appended claim.

I claim as my invention:—

In a battery-charging system, the combination with a storage battery, a generator connected thereto having an armature and main and auxiliary brushes co-operating therewith, and a prime mover for said generator, of electroresponsive means for terminating the operation of said prime mover, said means being energized from said auxiliary brush and one of said main brushes.

In testimony whereof, I have hereunto subscribed my name this 8th day of July, 1922.

WILLIAM E. MENZIES.